United States Patent [19]

Miyatake et al.

[11] Patent Number: 4,561,216

[45] Date of Patent: Dec. 31, 1985

[54] WORKPIECE ENGAGING APPARATUS IN GRINDING MACHINES

[75] Inventors: Satoshi Miyatake, Kawagoe; Mitsuo Abe, Kiyose; Masao Kume, Tokyo; Shigehiro Yonemura; Hiroshi Umino, both of Sayama, all of Japan

[73] Assignee: Honda Giken Kogyo Kabushiki Kaisha, Tokyo, Japan

[21] Appl. No.: 638,689

[22] Filed: Aug. 8, 1984

[30] Foreign Application Priority Data

Aug. 9, 1983 [JP] Japan .................................. 58-146021

[51] Int. Cl.⁴ .............................................. B24B 49/16
[52] U.S. Cl. ................................ 51/165.92; 51/52 HB; 51/95 GH; 409/15
[58] Field of Search ............. 51/95 R, 95 GH, 165.92, 51/52; 409/12, 15

[56] References Cited

U.S. PATENT DOCUMENTS 2,374,258  4/1945  Davenport ....................... 51/52 HB
2,642,702  6/1953  Staples ............................. 51/95 GH

FOREIGN PATENT DOCUMENTS 856699  8/1981  U.S.S.R. ................................ 409/15

*Primary Examiner*—Harold D. Whitehead
*Attorney, Agent, or Firm*—Banner, Birch, McKie & Beckett

[57] ABSTRACT

An apparatus for bringing a rotary grinding tool into mesh with a workpiece while minimizing a grinding resistance by the workpiece when the workpiece is to be ground by the rotary grinding tool. An electric power detector is associated with the rotary tool and a sensor is associated with the workpiece. A gate is opened by a peak current detected by the power detector when the workpiece and the grinding tool engage each other and a pulse signal from the sensor, engaging a clutch to connect the workpiece directly to a drive source in response to a signal supplied upon elapse of a prescribed interval of time through a delay circuit.

8 Claims, 10 Drawing Figures

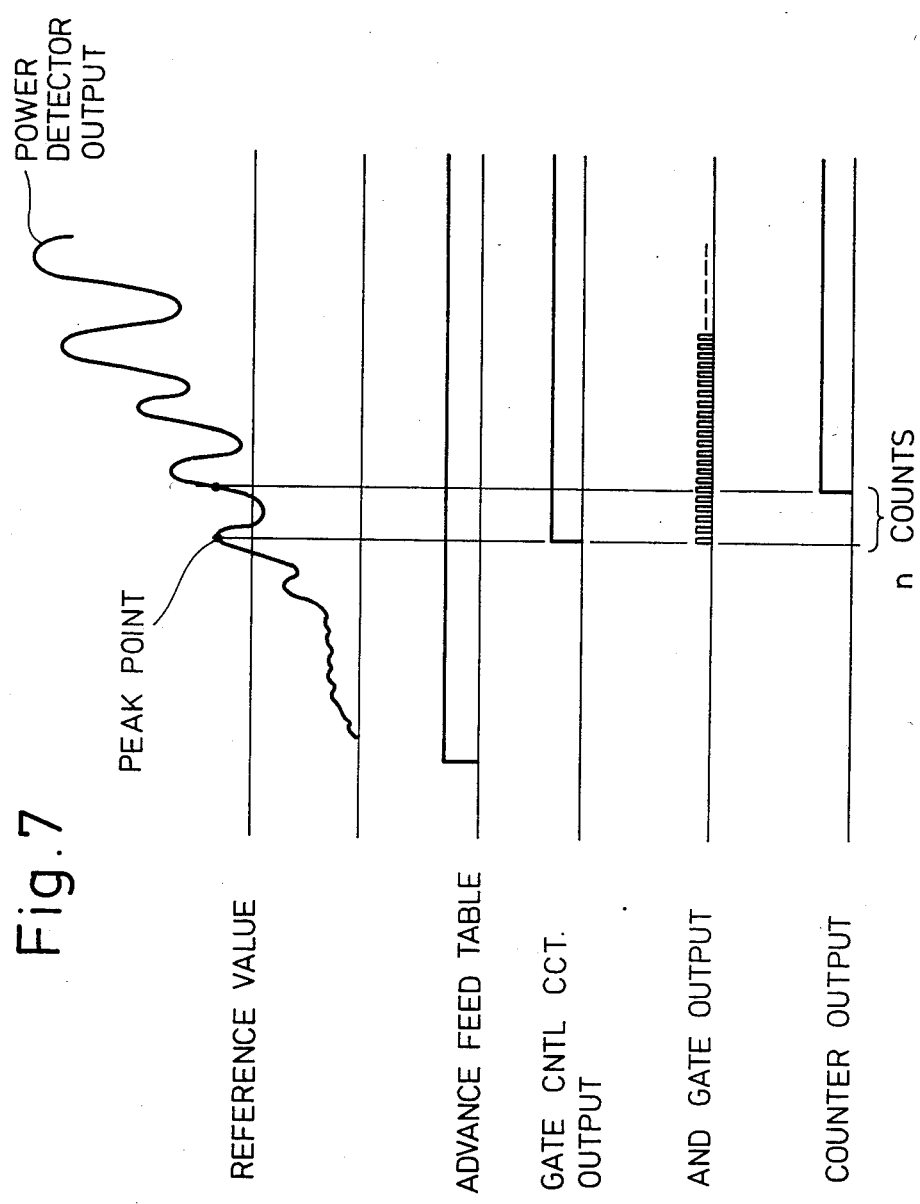

WORKPIECE ENGAGING APPARATUS IN GRINDING MACHINES

BACKGROUND OF THE INVENTION

The present invention relates to a workpiece engaging or aligning apparatus for use in a grinding machine, and more particularly to a workpiece engaging or aligning apparatus for bringing a workpiece such as a gear into optimum engagement or mesh with a grinding wheel when the workpiece is to be ground by the rotating grinding wheel in a grinding machine.

There have been used in the art grinding machines for grinding workpieces such as gears with a grinding wheel having helical teeth on an outer peripheral surface thereof which are held in mesh with gear teeth. Before grinding the gear teeth, the gear is displaced toward the grinding wheel by a feed motor or the like, and then gear teeth are brought into mesh with the helical teeth on the grinding wheel. Where the gear to be ground is of an eccentric shape or has irregular slots or grooves between the gear teeth, the gear teeth surfaces will be excessively ground. Generally, the grinding allowance accepted in the art to be suitable for gear teeth is in the range of from 0.05 mm to 0.10 mm. It has also been confirmed in the art that for mass-produced gears, the eccentricity of the diameter of a root circle of the gears which serves as a reference when grinding the gear teeth surfaces should be in a tolerance range below about 0.5 mm for a good grinding efficiency. Assuming that the gear root circle eccentricity and irregular gear grooves are expressed wholly as an equivalent eccentricity $\epsilon$, each gear tooth surface is required to have a grinding allowance of 2 $\epsilon$. As an example, a gear having an equivalent eccentricy $\epsilon$ of 0.05 due to an eccentric gear shape and uneven gear grooves has an overall eccentricity 2 $\neq$ of 0.1, which is comparable to a normal grinding allowance.

The equivalent eccentricity will be described in greater detail by way of example.

When grinding a gear, it is customary practice to bring a grinding wheel and the gear which have mutually perpendicular rotational axes into mesh with each other, and then disconnect a cluch on a shaft for rotating the gear for matching the phases of the grinding wheel and the gear. The gear is now allowed to rotate with the rotation of the grinding wheel. When a feed motor is energized, the gear is advanced into mesh with the grinding wheel until no backlash is produced between the gear and the grinding wheel, whereupon the clutch is connected again to rotate the grinding wheel and the gear in synchronism with each other.

FIGS. 1 and 2 of the accompanying drawings illustrate, in a modified fashion, conditions in which the center of a gear or workpiece W does not coincide with the center of rotation of the workpiece W. More specifically, in FIG. 1(a), the center of gravity GC of the gear W is displaced off the center of rotation WC of the gear W in a direction toward a point where the gear W meshes with the grinding wheel T. When the gear W is turned 90° from the position of FIG. 1(a), the gear W assumes the position shown in FIG. 1(b). In the position of FIG. 1(b), a thickness of the gear W which corresponds to an eccentricity of the gear W is ground off excessively by cutting edges of the grinding wheel T. As the gear W is further turned 180° from the position of FIG. 1(b), another thickness of the gear W equivalent to the eccentricity thereof is ground off by the grinding wheel T.

In the condition of FIG. 2(a), the center of gravity GC of the gear W is displaced off the center of rotation WC of the gear W in a direction that is angularly spaced 90° from a point of meshing contact between the gear W and the grinding wheel T. When the gear W is angularly moved 180° from the position of FIG. 2(a) to the position of FIG. 2(b), a thickness corresponding to the shaded area (FIG. 3) or 2 will be ground off by the grinding wheel T.

Therefore, if the center of gravity GC of the gear W is displaced off the center of rotation WC thereof in a direction angularly spaced 90° from the point of meshing contact with the grinding wheel T, then the grining wheel T requires the gear W to have a grinding allowance which is twice that with respect to the meshing condition shown in FIG. 1. Stated otherwise, where the same grinding allowance as that shown in FIG. 2 is to be ground off and if the gear W and the grinding wheel T are kept in mesh with each other as illustrated in FIG. 1, then the gear W is permitted to be eccentric to the extent which is twice that shown in FIG. 1. Therefore, the grinding operation can be effected more easily in the condition of FIG. 1 than in the condition of FIG. 2.

SUMMARY OF THE INVENTION

The present invention has been made on the basis of the following finding: Where an equivalent eccentricity is large, a grinding resistance by a gear to be ground to a grinding wheel is increased, resulting in an increase in a load on a motor which rotates the grinding wheel. Therefore, the speed of rotation of the motor is varied to increase a current which energizes the motor. As shown in FIG. 4, it has been confirmed that the maximum grinding resistance is not necessarily developed when the center of a grinding edge of the grinding wheel is aligned with a point of eccentricity of the gear, but the point of maximum grinding resistance is shifted behind the direction of eccentricity of the gear under the influence of a gear feed in addition to the eccentricity of the gear. Therefore, a clutch for connecting the gear to a drive source is engaged with a time delay corresponding to a certain number of gear teeth after the drive current for the grinding wheel motor is maximum. Stated otherwise, the number of teeth Zw of the gear is counted, and the clutch is engaged with a time delay commensurate with n gear teeth after the gear tooth corresponding to the peak of the drive current for the grinding wheel motor. By thus connecting the clutch, the grinding wheel and the gear are prevented from meshing with each other at least under the condition shown in FIG. 2, and the gear will have a proper grinding allowance.

It is an object of the present invention to provide a workpiece engaging apparatus for use in a grinding machine for optimizing a grinding allowance of a workpiece by bringing the workpiece and a grinding tool into synchronized operation while in mutual engagement.

According to the present invention, there is provided a workpiece engaging apparatus comprising a tool drive source for driving a rotary tool, a workpiece drive source for driving a workpiece through a clutch mechanism, the workpiece being in operative engagement with the rotary tool, a detector circuit for detecting an increase in a load in the tool drive source, and a circuit for actuating the clutch mechanism with a time delay after a predetermined load increase detected by the detector.

The detector circuit includes a power detector in a power supply circuit for supplyng an electric drive power to the tool drive source.

The detector circuit also includes a comparator connected to an output terminal of the power detector.

The circuit for actuating the clutch mechanism includes a sensor disposed with respect to the workpiece, a gate control circuit connected to an output terminal of the comparator, an AND gate responsive to output signals from the sensor and the gate control circut, and a counter for receiving an output signal from the AND gate for producing an output signal to actuate the clutch mechanism.

The comparator has an input terminal supplied with a reference signal and another input terminal supplied with an output signal from the power detector, the gate control circuit being responsive to an output signal from the comparator for supplying an output signal to the AND gate when the output signal from the comparator reaches a peak value.

The workpiece comprises a gear and the rotary tool comprises a grinding wheel held in mesh with the gear.

The workpiece comprises a gear and the rotary tool comprises a grinding wheel held in mesh with the gear, the counter being responsive to the output signal from the AND gate for issuing the output signal with a time delay corresponding to a predetermined number of gear teeth of the gear.

The sensor comprises a proximity sensor disposed in confronting relation to the gear teeth of the gear.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 is a diagram showing the waveforms of output signals from a power detector, a gate control circuit, and a counter.

DESCRIPTION OF THE PREFERRED EMBODIMENT

Figure 1A:
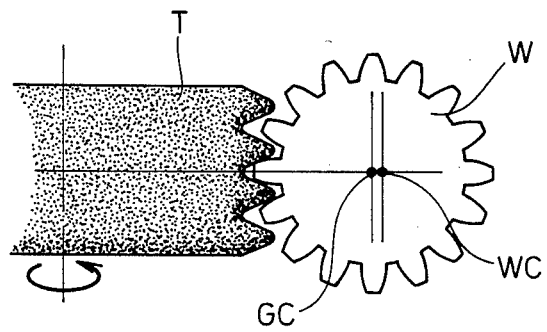
FIG. 1(a) is a schematic diagram showing a gear to be ground and a grinding wheel, the gear having a center of gravity displaced off a center of rotation thereof in a direction toward a point in which the gear and the grinding wheel are held in mesh with each other.
Figure 1B:
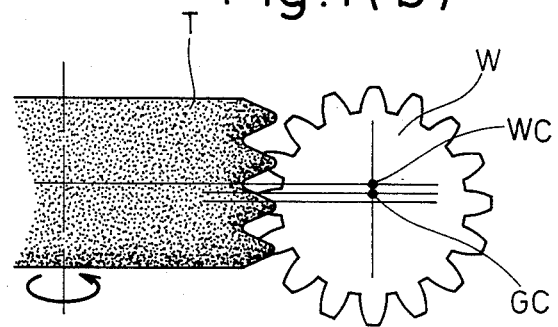
FIG. 1(b) is a diagram similar to FIG. 1(a), illustrative of the gear turned 90° from the position of FIG. 1(a)
Figure 1C:
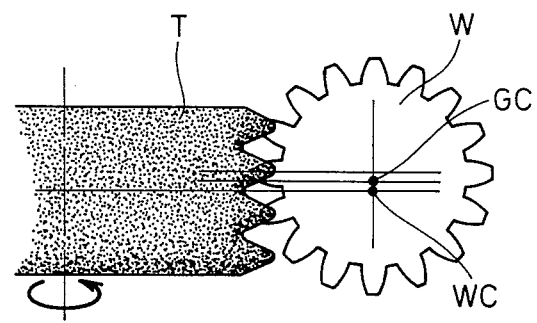
FIG. 1(c) is a diagram similar to FIG. 1(a), showing the gear turned 180° from the position of FIG. 1(b)
Figure 2A:
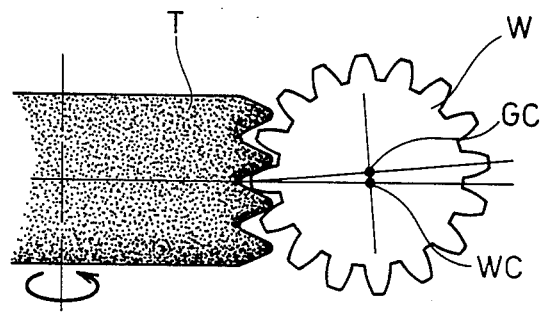
FIG. 2(a) is a schematic diagram illustrating a gear to be ground and a grinding wheel, the gear having a center of gravity displaced off a center of rotation thereof in a direction that is angularly spaced 90° from a point in which the gear and the grinding wheel are held in mesh with each other.
Figure 2B:
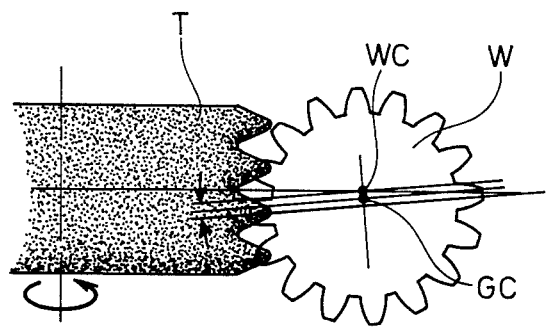
FIG. 2(b) is a diagram similar to FIG. 2(a), showing the gear turned 180° from the position illustrated in FIG. 2(a)
Figure 3:
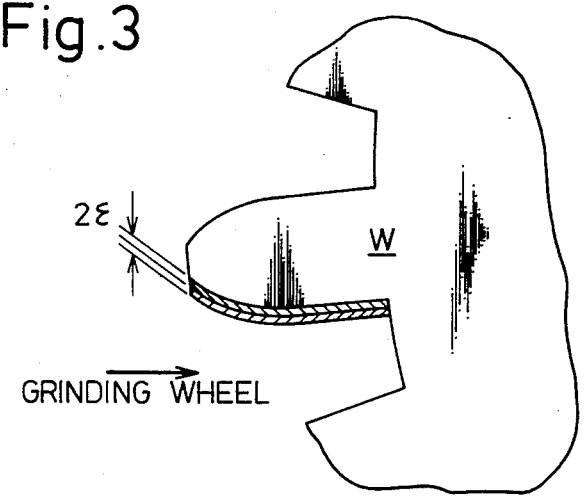
FIG. 3 is an enlarged fragmentary view of the gear of FIG. 2(b), explanatory of a grinding allowance to be ground off by the grinding wheel.
Figure 4:
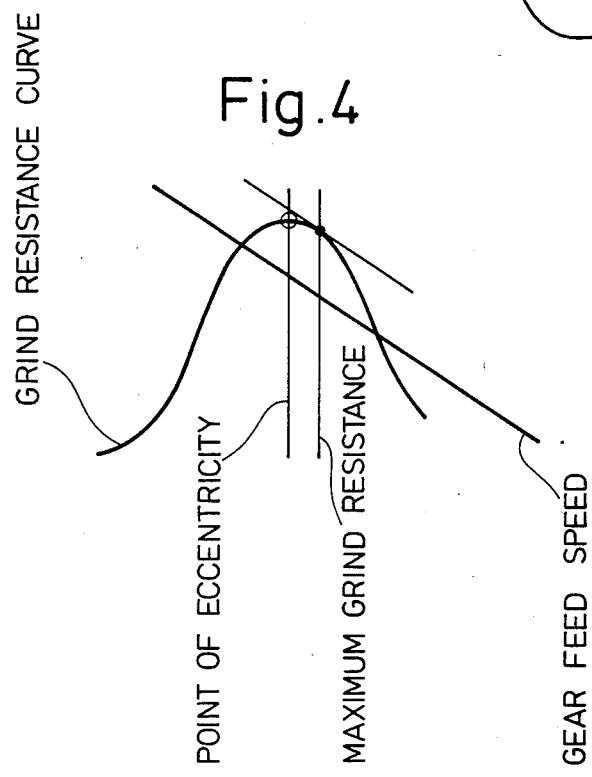
FIG. 4 is a diagram showing a curve of the correlation between a grinding resistance created by an eccentricity of a gear and a gear feeding speed at the time the grinding wheel and the gear are to be meshed.
Figure 5:
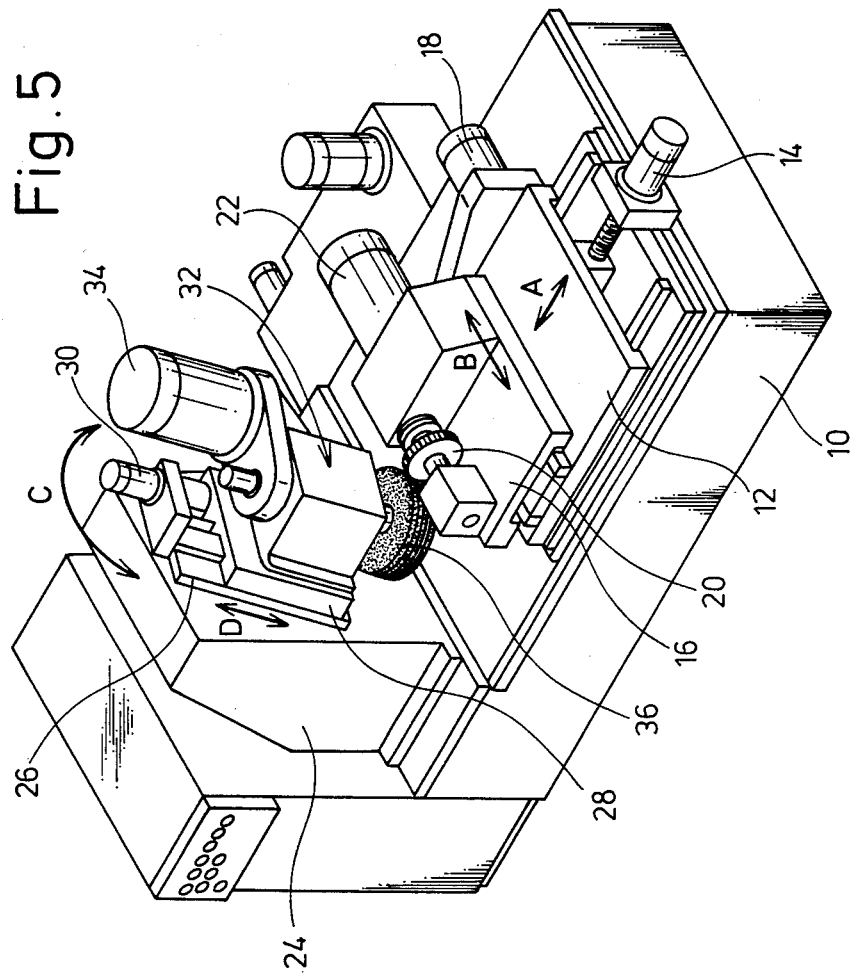
FIG. 5 is an isometric view of a gear grinding machine incorporating a workpiece engaging apparatus according to the present invention.

FIG. 5 shows a gear grinding machine incorporating a workpiece engaging apparatus or a gear meshing apparatus according to the present invention. The gear grinding machine includes a bed 10 supporting thereon a feed table 12 movable back and forth in the directions of the arrow A by means of a feed motor 14. A traverse table 16 is mounted on the feed table 12 and movable back and forth in the directions of the arrow B perpendicular to the directions of the arrow A by means of a traverse motor 18. A workpiece or gear 20 is detachably mounted on the traverse table 16, the workpiece 20 being rotatable by means of a workpiece spindle motor 22.

Figure 6:
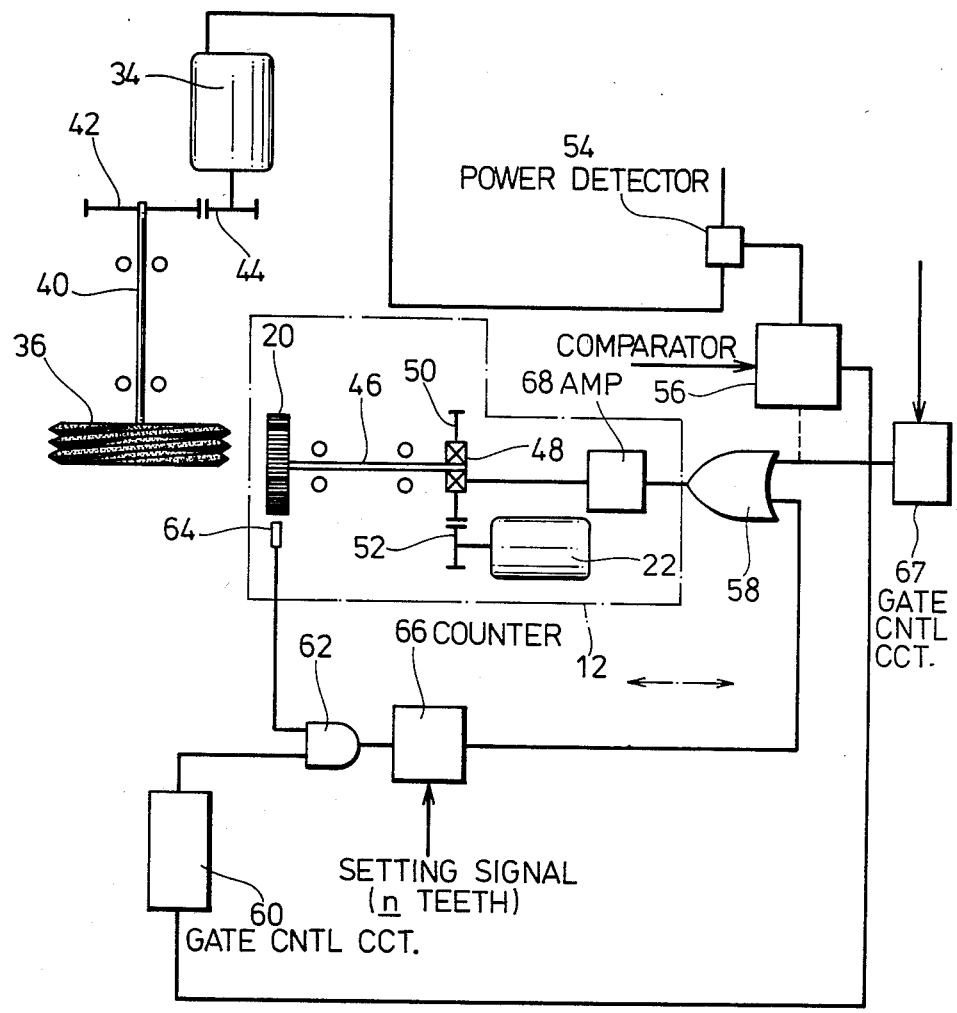
FIG. 6 is a block diagram of a control circut incorporated in the gear grinding machine shown in FIG. 5.

A column 24 is disposed on the bed 10 in a position aligned with the directions in which the feed table 12 is movable. The column 24 supports a turntable 26 mounted on a side wall surface thereof and turnable in the directions of the arrow C by a motor (not shown) housed in the column 24. A shift table 28 is movably mounted on the turntable 26. The shift table 28 is movable in the directions of the arrow D by a grinding wheel shifting motor 30, the shift tabe 28 supporting a grinding wheel spindle unit 32 thereon. The grinding wheel spindle unit 32 is composed of a grinding wheel spindle motor 34 and a circular grinding wheel 36 having several grooves defined in an outer peripheral surface thereof. As illustrated in FIG. 6, the grinding wheel 36 is supported by a rotatable shaft 40 having on one end thereof a gear 42 of a relatively large diameter held in mesh with a smaller-diameter gear 44 coupled directly to a grinding wheel drive motor 34. Therefore, the grinding wheel 36 is rotated in response to energization of the motor 34 at a rate of speed determined by a gear ratio and gear diameters of the gears 42, 44.

The workpiece or gear 20 to be ground is detachably mounted on one end of a rotatable shaft 46 supporting on the other end thereof a gear 50 of a relatively large diameter through a clutch 48. The gear 50 is held in mesh with a smaller-diameter gear 52 driven to rotate by the workpiece spindle motor 22.

According to the apparatus of the present invention, a power supply system for supplying an electric power to the grinding wheel motor 34 includes a power detector 54 having an output terminal connected to one of the input terminals of a comparator 56 with its other input terminal supplied with a predetermined reference signal. The comparator 56 has an output terminal connected to a gate control circuit 60 controlled by a drive current supplied to the grinding wheel motor 34. As clearly shown in FIG. 7, the comparator 56 determines whether the drive current of the grinding wheel motor 34 is greater than a predetermined level (the reference signal applied to the comparator 56), and supplies an output to the gate control circuit 60. The gate control circuit 60 has an output terminal connected to one input terminal of an AND gate 62. The gate control circuit 60 is responsive to an output signal from the comparator 56 for supplying an output signal to the AND gate 62 when the output signal form the comparator 56 reaches a peak. The other input terminal of the AND gate 62 is connected to the output terminal of a proximity sensor 64, for example, placed in the vicinity of the gear 20 for detecting the gear teeth thereof. The AND gate 62 has an output terminal connected to a counter 66. The counter 66 is suplied with a signal for bringing the gear 20 and the grinding wheel 36 into mutual mesh at a time slightly delayed from a time when a grinding resistance is maximum. More specifically, if the output signal from the AND gate 62 were supplied directly to the clutch 48, the gear 20 and the grinding wheel 36 woud be meshed when the grinding resistance is maximum. To avoid this, the output signal from the AND gate 62 is applied with a slight time delay commensurate with n gear teeth of the gear 20. The counter 66 has an output terminal connected through an amplifier (not shown) to one input terminal of an OR gate 58. The other input terminal of the OR gate 58 is coupled to a gate control, circuit 67 which will issue an output signl a prescribed time after a meshing signal for the grinding wheel 36 and the gear 20 has been applied to the feed motor 14, in the absence of no output signal greater than the reference signal from the comparator 56. The comparator 56 may have another output terminal connected to the OR gate 58 for enabling the OR gate 58 upon elapse of a prescribed time in the event that the input signal to the comparator 56 is smaller than the reference signal applied thereto. The OR gate 58 has an output terminal connected through an amplifier 68 to the clutch 48.

Operation of the apparatus of the above construction will hereinafter be described.

The grinding wheel 36 and the workpiece 20 as they rotate are first brought into mesh with each other in response to energization of the feed motor 14. At this time, the rotation of the feed motor 14 causes the feed table 12 to advance in the direction of the arrow A until the grinding wheel 36 and the gear 20 are brought into mesh with each other. Then, the clutch 38 is disengaged to allow the gear 20 to rotate freely with the grinding wheel 36. The clutch 38 may be manually disengaged. Where an equivalent eccentricity $\epsilon$ of the gear 20 is relatively small and the speed of advancing movement thereof is low at this time, the drive current for the grinding wheel motor 34 is not appreciably increased. If no current greater than the reference signal applied to the comparator 56 flows a prescribed time after the meshing signal has been applied to the feed motor 14, the comparator 56 generates no output signal. Therefore, the gate control circuit 67 supplies a signal to the OR gate 58, which is opened to produce an output signal that is amplified by the amplifier 68 to engage the clutch 48.

If the gear 20 has a greater equivalent eccentricity $\epsilon$, then the load on the grinding wheel 36 is periodically varied to cause the drive current supplied to the grinding wheel motor 34 to vary accordingly, the drive current being also fed to the comparator 56. When a drive current for the grinding wheel motor 34 which is greater than the reference signal level, the comparator 56 applies its output signal to the gate control circuit 60, which after having detected that the output signal from the comparator 56 reaches a peak, continuously issues an output signal to the AND gate 62 for a given interval of time. The AND gate 62 is also supplied with a signal from the sensor 64 which is representative of the gear teeth of the gear 20. As a result, the AND gate 62 is opened to supply a gate signal to the counter 66. The counter 66 is also supplied with a setting signal indicative of an nth gear tooth. The counter 66 counts signals from the AND gate 62 which are indicative of gear teeth of the gear 20 corresponding to peak currents supplied to the grinding wheel motor 34. When the count in the counter 66 reaches the setting signal, the counter issues an output signal to the OR gate 58, from which the signal is applied through the amplifier 68 to the clutch 48 (see FIG. 7). The nth gear tooth is determined dependent on the speed of gear feed, the inertia of the grinding wheel 36, and the type of the grinding wheel motor 34. It has experimentally been confirmed that n is preferably in the range of 9/10 through 19/20 of the total number Zw of the gear teeth of the gear 20.

The output signal from the OR gate 58 is amplifed by the amplifier 68, and the clutch 48 is connected by the amplified signal from the amplifier 58 to allow rotative power from the workpiece spindle motor 22 to be transmitted from the gear 52 to the gear 50, the gears 52, 50 serving as a speed reducer. The gear 20 is now rotated through the clutch 48 and the gears 52, 50 by the motor 22, whereby the grinding wheel 36 and the gear 20 rotate in synchronism with each other. Since at this time the clutch 48 is engaged when the gear tooth which is n gear teeth behind the gear tooth corresponding to the peak current supplied to the grinding wheel motor 34 is brought into mesh with the grinding wheel 36, the equivalent eccentricity of the gear 20 with respect to the grinding wheel 36 can be held to a minimum.

With the arrangement of the present invention, the meshing condition of the rotating grinding wheel and the gear held in mesh therewith is detected as an electric quantity, and the grinding wheel and the gear are put into synchronous rotation by driving the gear at the time the gear tooth corresponding to the greatest electric quantity as detected is out of mesh with the grinding wheel. Accordingly, the grinding allowance of the gear to be ground by the grinding wheel can be reduced to as small a degree as possible.

While the invention has been particularly shown and described with respect to a preferred embodiment thereof, it will be understood by those in the art that various changes in form and detail may be made therein without departing from the spirit and scope of the present invention.

What is claimed is:

1. A workpiece engaging apparatus comprising:
    (a) a tool drive source for driving a rotary tool;
    (b) a workpiece drive source for driving a workpiece through a clutch mechanism, the workpiece being in operative engagement with the rotary tool;
    (c) a detector circuit for detecting an increase in a load in said tool drive source; and
    (d) a circuit for actuating said clutch mechanism with a time delay after a predetermined load increase detectd by said detector.

2. A workpiece engaging apparatus according to claim 1, wherein said detector circuit includes a power detector in a power supply circuit for supplying an electric drive power to said tool drive source.

3. A workpiece engaging apparatus according to claim 2, wherein said detector circuit also includes a comparator connected to an output terminal of said power detector.

4. A workpiece engaging apparatus according to claim 2, wherein said circuit for actuating said clutch mechanism includes a sensor disposed with respect to the workpiece, a gate control circuit connected to an output terminal of said comparator, an AND gate openable in response to output signals from said sensor and said gate control circuit, and a counter receptive of an output signal from said AND gate for producing an output signal to actuate said clutch mechanism.

5. A workpiece engaging apparatus according to claim 4, wherein said comparator has an input terminal supplied with a reference signal and another input terminal supplied with an output signal from said power detector, said gate control circuit being responsive to an output signal from said comparator for supplying an output signal to said AND gate when said output signal from said comparator reaches a peak value.

6. A workpiece engaging apparatus according to claim 1, wherein said workpiece comprises a gear and said rotary tool comprises a griding wheel held in mesh with said gear.

7. A workpiece engaging apparatus according to claim 4, wherein said workpiece comprises a gear and said rotary tool comprises a grinding wheel held in mesh with said gear, said counter being responsive to the output signal from said AND gate for issuing said output signal with a time delay corresponding to a predetermined number of gear teeth of said gear.

8. A workpiece engaging apparatus according to claim 7, wherein said sensor comprises a proximity sensor disposed in confronting relation to the gear teeth of said gear.

* * * * *

UNITED STATES PATENT AND TRADEMARK OFFICE
CERTIFICATE OF CORRECTION

PATENT NO. : 4,561,216
DATED : December 31, 1985
INVENTOR(S) : Satoshi Miyatake et al.

It is certified that error appears in the above-identified patent and that said Letters Patent is hereby corrected as shown below:

Column 1, line 38, "$2\frac{1}{3}$" should be —$2\varepsilon$—;

Column 2, line 15, "grining" should be —grinding—;

line 48, "n" should be —$\underline{n}$—;

Column 3, line 12, "circut" should be —circuit—;

Column 5, line 16, "n" should be —$\underline{n}$—;

Column 6, line 3, "nth" should be —$\underline{n}$th—;

line 10, "nth" should be —$\underline{n}$th—;

line 14, "n" should be —$\underline{n}$—;

line 25, "n" should be —$\underline{n}$—; and

Claim 6, Column 8, line 3, "griding" should be —grinding—.

Signed and Sealed this

Twenty-second Day of April 1986

[SEAL]

Attest:

DONALD J. QUIGG

Attesting Officer    Commissioner of Patents and Trademarks